US012627559B2

(12) United States Patent
Kosugi et al.

(10) Patent No.: US 12,627,559 B2
(45) Date of Patent: May 12, 2026

(54) APPROVAL AUTOMATION FOR CHANGE IN NETWORK VIRTUALIZATION ENVIRONMENT

(71) Applicant: Rakuten Mobile, Inc., Tokyo (JP)

(72) Inventors: Masaaki Kosugi, Tokyo (JP); Yuichi Koike, Tokyo (JP)

(73) Assignee: Rakuten Mobile, Inc., Tokyo (JP)

( * ) Notice: Subject to any disclaimer, the term of this patent is extended or adjusted under 35 U.S.C. 154(b) by 35 days.

(21) Appl. No.: 18/755,997

(22) Filed: Jun. 27, 2024

(65) Prior Publication Data

US 2025/0293922 A1 Sep. 18, 2025

(30) Foreign Application Priority Data

Mar. 14, 2024 (JP) .................................. 2024-039948

(51) Int. Cl.
*H04L 41/0813* (2022.01)
*G06F 8/71* (2018.01)
*H04L 41/122* (2022.01)

(52) U.S. Cl.
CPC ............ *H04L 41/0813* (2013.01); *G06F 8/71* (2013.01); *H04L 41/122* (2022.05)

(58) Field of Classification Search
CPC ............... H04L 41/0813; H04L 41/122; H04L 45/48; H04L 45/02; H04L 49/25; H04L 45/125; H04L 67/125; H04L 63/10; H04L 41/12; H04L 41/082; H04L 41/0895; G06F 8/71
See application file for complete search history.

(56) References Cited

U.S. PATENT DOCUMENTS

| | | |
|---|---|---|
| 2018/0018193 A1 | 1/2018 | Yabushita et al. |
| 2019/0164100 A1* | 5/2019 | Rotta ................... G06Q 10/067 |
| 2021/0103840 A1* | 4/2021 | Kwong ................. G06N 20/00 |
| 2024/0220505 A1* | 7/2024 | Shashi ............... G06F 16/2246 |

FOREIGN PATENT DOCUMENTS

WO 2016/121830 A1 8/2016

* cited by examiner

*Primary Examiner* — Tonia L Dollinger
*Assistant Examiner* — Joseph M Cousins
(74) *Attorney, Agent, or Firm* — Sughrue Mion, PLLC

(57) ABSTRACT

A processor acquires a current change request of a network virtualization environment, and automatically rejects the current change request if a determination criterion that satisfies a value of a comparison item in the current change request is not detected in a determination criterion management database. If the determination criterion that satisfies the value of the comparison item is detected, the processor searches for a past change record that satisfies the determination criterion (execution result of the past change of the same type). If the execution result of the past change is not detected, the processor automatically rejects the current change request. If the execution result of the past change is detected, the processor automatically approves the current change request when a predetermined condition related to the execution result of the past change is satisfied, but automatically rejects the current change request when the predetermined condition is not satisfied.

9 Claims, 12 Drawing Sheets

FIG. 6

EXAMPLE OF CHANGE REQUEST

| ITEM | VALUE (EXAMPLE) | |
|---|---|---|
| ID | Character String Representing ID | |
| CHANGE GROUP NAME | BIOS Upgrade, Patch Application 1, etc. | COMPARISON ITEM |
| PRIORITY/URGENCY | P1, P2, P3, P4, etc. | COMPARISON ITEM |
| INFLUENCE DEGREE | Major, Minor, No impact, etc. | COMPARISON ITEM |
| TARGET DOMAIN | Infra, RAN, Core, etc. | COMPARISON ITEM |
| TYPE OF HARDWARE | Character String Representing Model Number, etc. | COMPARISON ITEM |
| VERSION OF FIRMWARE | Character String Representing Version | COMPARISON ITEM |
| VERSION OF SOFTWARE | Character String Representing Version | COMPARISON ITEM |
| CHANGE PROCEDURE DESCRIPTION | Character String Indicating Description, Images, etc. | |
| SCHEDULED START TIME | YYYY/MM/DD/HH/mm/ss | |
| SCHEDULED END TIME | YYYY/MM/DD/HH/mm/ss | |
| ASSUMED PROBLEM LIST | Character String Describing Assumed Problems | |

FIG. 7

EXAMPLE OF CHANGE RECORD

| ITEM | VALUE (EXAMPLE) | |
|---|---|---|
| ID | Character String Representing ID | |
| CHANGE GROUP NAME | BIOS Upgrade, Patch Application 1, etc. | COMPARISON ITEM |
| PRIORITY/URGENCY | P1, P2, P3, P4, etc. | COMPARISON ITEM |
| INFLUENCE DEGREE | Major, Minor, No impact, etc. | COMPARISON ITEM |
| TARGET DOMAIN | Infra, RAN, Core, etc. | COMPARISON ITEM |
| TYPE OF HARDWARE | Character String Representing Model Number, etc. | COMPARISON ITEM |
| VERSION OF FIRMWARE | Character String Representing Version | COMPARISON ITEM |
| VERSION OF SOFTWARE | Character String Representing Version | COMPARISON ITEM |
| CHANGE PROCEDURE DESCRIPTION | Character String Indicating Description, Images, etc. | |
| SCHEDULED START TIME | YYYY/MM/DD/HH/mm/ss | |
| SCHEDULED END TIME | YYYY/MM/DD/HH/mm/ss | |
| ASSUMED PROBLEM LIST | Character String Describing Assumed Problems | |
| ACTUAL PROBLEM LIST | Character String Describing Actual Problems That Occurred | |
| START TIME | YYYY/MM/DD/HH/mm/ss | |
| END TIME | YYYY/MM/DD/HH/mm/ss | |
| EXECUTION RESULT DESCRIPTION | Character String Indicating Description | |
| SUCCESS/ FAILURE FLAG | 0/1 | |

FIG. 8

EXAMPLE OF DETERMINATION CRITERION

| ITEM | VALUE (EXAMPLE) | |
|---|---|---|
| CHANGE GROUP NAME | BIOS Upgrade | ⎫ |
| PRIORITY/URGENCY | P2 or Higher | |
| INFLUENCE DEGREE | Minor or Lower | |
| TARGET DOMAIN | Core | COMPAR-ISON ITEMS |
| TYPE OF HARDWARE | Character String Representing Model Number, etc. | |
| VERSION OF FIRMWARE | VERSION 02 to 12 | |
| VERSION OF SOFTWARE | VERSION 03 to 10 | ⎭ |
| SUCCESS COUNT THRESHOLD VALUE | 15 | |

FIG. 9

EXAMPLE OF DETERMINATION CRITERION

| ITEM | VALUE (EXAMPLE) | |
|---|---|---|
| CHANGE GROUP NAME | Patch Application 1 | ⎫ |
| PRIORITY/URGENCY | P3 or Lower | |
| INFLUENCE DEGREE | Minor or Higher | |
| TARGET DOMAIN | RAN | COMPAR-ISON ITEMS |
| TYPE OF HARDWARE | Character String Representing Model Number, etc. | |
| VERSION OF FIRMWARE | VERSION 05 to 12 | |
| VERSION OF SOFTWARE | VERSION 07 | ⎭ |
| SUCCESS COUNT THRESHOLD VALUE | 10 | |

FIG. 10

EXAMPLE OF DETERMINATION CRITERION

| ITEM | VALUE (EXAMPLE) | |
|---|---|---|
| CHANGE GROUP NAME | Patch Application 2 | COMPAR -ISON ITEMS |
| PRIORITY/URGENCY | P4 | |
| INFLUENCE DEGREE | No impact | |
| TARGET DOMAIN | Infra | |
| TYPE OF HARDWARE | Character String Representing Model Number, etc. | |
| VERSION OF FIRMWARE | Version 14 | |
| VERSION OF SOFTWARE | | |
| SUCCESS COUNT THRESHOLD VALUE | 13 | |

FIG. 11

EXAMPLE OF DETERMINATION CRITERION

| ITEM | VALUE (EXAMPLE) | |
|---|---|---|
| CHANGE GROUP NAME | Patch Application 3 | COMPAR -ISON ITEMS |
| PRIORITY/URGENCY | | |
| INFLUENCE DEGREE | | |
| TARGET DOMAIN | | |
| TYPE OF HARDWARE | | |
| VERSION OF FIRMWARE | | |
| VERSION OF SOFTWARE | | |
| SUCCESS COUNT THRESHOLD VALUE | 8 | |

APPROVAL AUTOMATION FOR CHANGE IN NETWORK VIRTUALIZATION ENVIRONMENT

CROSS-REFERENCE TO RELATED APPLICATION(S)

This application claims priority to Japanese patent application No. 2024-039948, filed on Mar. 14, 2024; the entire contents of which are incorporated herein by reference.

TECHNICAL FIELD

The present disclosure relates to approval automation for change in a network virtualization environment.

BACKGROUND

The information disclosed in this background section is only for enhancement of understanding of the general background of the disclosure and should not be taken as an acknowledgement or any form of suggestion that this information forms the prior art already known to a person skilled in the art.

Cloud computing (referred to as a "cloud" below) in which computing resources virtualized on physical resources such as servers are used on demand has become widely spread against the background of improvement in performance of general-purpose servers and enrichment of network infrastructure. In addition, network function virtualization (NFV) in which network functions are virtualized and provided on a cloud is known. NFV is a technology in which a virtualization technology and a cloud technology are used to separate hardware and software of various network services that have been running on dedicated hardware until now and to run the software on a virtualized infrastructure. With NFV, it is expected to enhance operation and reduce costs.

In recent years, virtualization has also been promoted in mobile networks.

In European Telecommunications Standards Institute (ETSI) NFV, an architecture of NFV is defined (see WO 2016/121830 A, for example).

SUMMARY OF THE INVENTION

In a case in which any change is made in the operation of a network virtualization environment, an approval process for determining whether or not to execute the change is generally conducted for prevention of troubles or the like.

Purposes of the change in the operation of the network virtualization environment are roughly divided into the following two:

1. Change executed for the purposes of planned maintenance such as patching, software upgrades, and hardware replacement.
2. Change for recovery after an occurrence of a problem.

It is common that a change that should be applied to a commercial network virtualization environment is verified (tested) in advance in a verification environment and requested after it is confirmed that there is no problem. However, since a virtualization environment used in a mobile network is on a large scale, it is very difficult to construct a verification environment equivalent to the commercial environment in terms of cost. Therefore, a case in which, even though it is confirmed that there is no problem in the verification environment, a problem occurs in the commercial environment is assumed. Therefore, in a case in which a change request is approved, a person who has a high technical level, abundant experience, and excellent judgment ability is required as a change approver.

In a case in which a change is performed for reason 1 above, at least one of the type and the number of change targets is large, and thus it may take enormous labor and time to approve the change. In addition, the same type of change request is repeated many times, and thus a lot of time is also spent to approve the changes.

In a case in which a change is performed for reason 2 above, the type and number of change targets are usually small, but it tends to be required to immediately determine whether or not to execute the change in order to quickly solve the problem. That is, approval is required quickly in a limited time.

Accordingly, the present disclosure provides a technique capable of quickly and accurately approving a change in a network virtualization environment.

According to an aspect of the present disclosure, there is provided a network management apparatus. The network management apparatus includes at least one processor. The processor is configured to acquire a current change request from a change request management database that stores change requests for a virtualization environment of a network; extract a value of a comparison item included in the current change request; search for a determination criterion that coincides with the value of the comparison item in a determination criterion management database that stores determination criteria; automatically reject the current change request if a determination criterion that coincides with the value of the comparison item is not detected in the determination criterion management database; if a determination criterion that coincides with the value of the comparison item is detected in the determination criterion management database, search for an execution result of a past change executed according to a past change request of the same type as the current change request, the execution result being a record of a past change that coincides with the determination criterion, in a change history management database that stores records of changes executed according to past change requests; automatically reject the current change request if an execution result of a past change is not detected in the change history management database; if an execution result of a past change is detected in the change history management database, determine whether or not a predetermined condition related to the execution result of the past change is satisfied; automatically approve the current change request if the predetermined condition is satisfied; and automatically reject the current change request if the predetermined condition is not satisfied.

According to another aspect of the present disclosure, there is provided a network management method. The network management method includes acquiring a current change request from a change request management database that stores change requests for a virtualization environment of a network; extracting a value of a comparison item included in the current change request; searching for a determination criterion that coincides with the value of the comparison item in a determination criterion management database that stores determination criteria; automatically rejecting the current change request if a determination criterion that coincides with the value of the comparison item is not detected in the determination criterion management database; if a determination criterion that coincides with the value of the comparison item is detected in the determination criterion management database, searching for an execution result of a past change executed according to a past change request of the same type as the current change request, the execution result being a record of a past change that coincides with the determination criterion, in a change history management database that stores records of changes executed according to past change requests; automatically rejecting the current change request if an execution result of a past change is not detected in the change history management database; if an execution result of a past change is detected in the change history management database, determining whether or not a predetermined condition related to the execution result of the past change is satisfied; automatically approving the current change request if the predetermined condition is satisfied; and automatically rejecting the current change request if the predetermined condition is not satisfied.

In the aspects of the present disclosure, if a determination criterion that coincides with a comparison item included in the current change request is stored, an execution result of a past change executed according to a past change request of the same type as the current change request is searched for. If the execution result of the past change is detected, it is determined whether or not the predetermined condition related to the execution result of the past change is satisfied. If the predetermined condition is satisfied, the current change request is automatically approved. Since it is thus determined whether or not to approve the current change request based on the execution result of the same type of the past change, it is possible to quickly and accurately approve the change in a network virtualization environment.

BRIEF DESCRIPTION OF THE DRAWINGS

Features, aspects, and advantages of embodiments of the disclosure will be described below with reference to the accompanying drawings, in which like reference numerals denote like elements, and wherein:

FIG. 6 is a table illustrating an example of a change request for the network virtualization environment;

FIG. 7 is a table illustrating an example of a change record for the network virtualization environment;

FIG. 8 is a table illustrating an example of a determination criterion for automatic approval of a change request;

FIG. 9 is a table illustrating another example of the determination criterion for the automatic approval of the change request;

FIG. 10 is a table illustrating still another example of the determination criterion for the automatic approval of the change request;

FIG. 11 is a table illustrating still yet another example of the determination criterion for the automatic approval of the change request;

DETAILED DESCRIPTION

Figure 1:
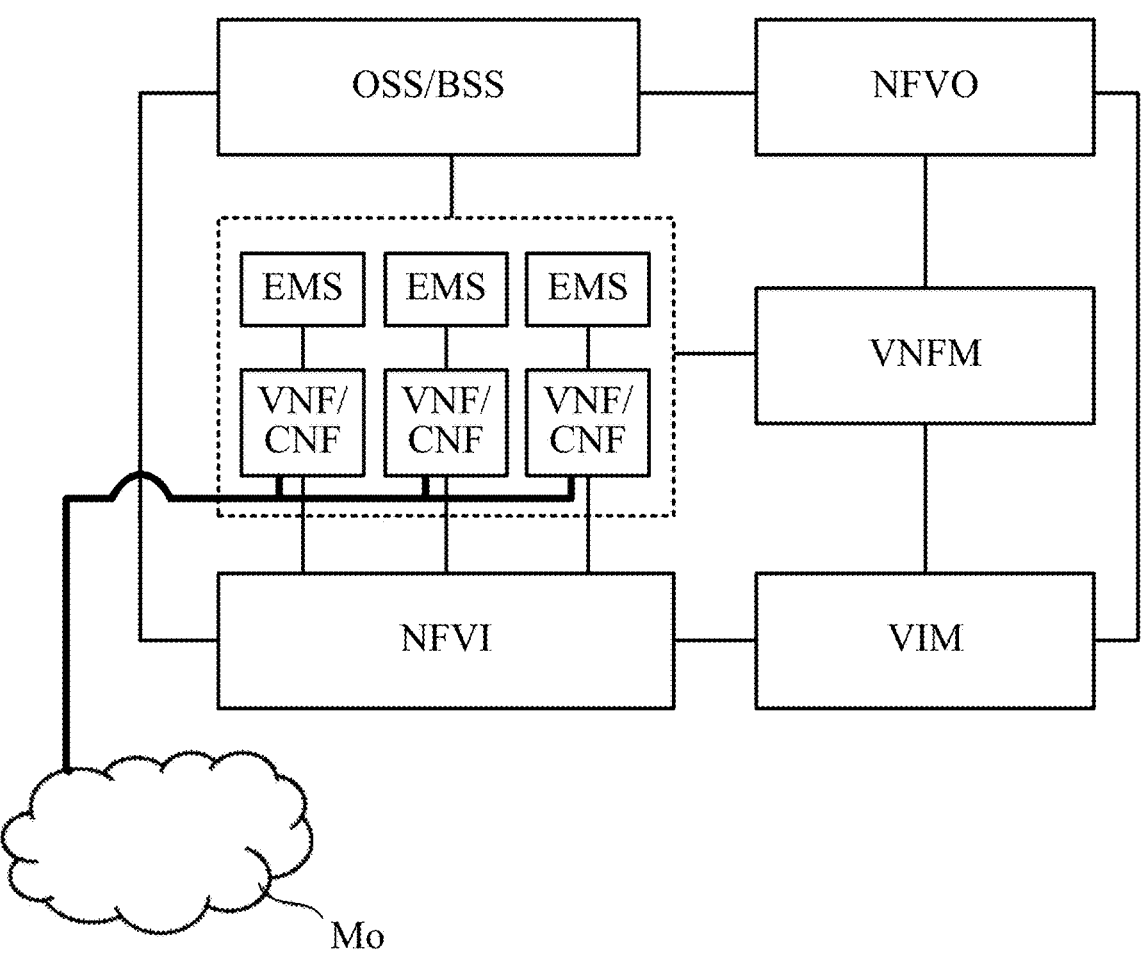
FIG. 1 is a block diagram illustrating components in a network virtualization environment defined by ETSI NFV.

The following detailed description of example embodiments refers to the accompanying drawings. The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, the flowchart and description of operations provided below relate to one of the various embodiments. It should be noted that it is possible to make other embodiments that do not exactly match the flowchart and its description. It is understood that in other embodiments one or more operations may be omitted, one or more operations may be added, one or more operations may be performed simultaneously (at least in part).

It will be apparent that systems and/or methods, described herein, may be implemented in different forms of hardware, software, or a combination of hardware and software. The actual specialized control hardware or software code used to implement these systems and/or methods is not limiting of the implementations. Thus, the operation and behavior of the systems and/or methods are described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of implementations. In fact, many of these features may be combined in ways not specifically recited in the claims and/or disclosed in the specification. Although each dependent claim listed below may directly depend on only one claim, the disclosure of implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]," "[A]

and/or [B]," or "at least one of [A] or [B]" are to be understood as including only A, only B, or both A and B.

The foregoing disclosure provides illustration and description but is not intended to be exhaustive or to limit the implementations to the precise form disclosed. Modifications and variations are possible in light of the above disclosure or may be acquired from practice of the implementations.

Hereinafter, embodiments according to the present disclosure will be described with reference to the accompanying drawings.

FIG. 1 is a block diagram illustrating components in a network virtualization environment defined by ETSI NFV.

Solid lines in FIG. 1 represent logical connections between components.

A virtual network function (VNF) corresponds to an application or the like operating in a virtual machine (VM) on a server, and implements network functions such as a directory service, a router, a firewall, and a load balancer in a software manner. As the VNF, an element of an evolved packet core (EPC) which is a core network of a mobile network or an element of an IP multimedia subsystem (IMS) may be implemented by software (virtual machine).

A containerized network function or cloud-native network function (CNF) is an evolved form of the VNF, corresponds to an application or the like operating in a container on a server, and implements a network function in a software manner. As the CNF, an element of the EPC or an element of the IMS may be implemented by software (container).

Hereinafter, "VNF/CNF" means "VNF" or "CNF".

An element management system (EMS) is a management function for each VNF/CNF. Each EMS is connected to a corresponding VNF/CNF to monitor the VNF/CNF.

A network function virtualization infrastructure (NFVI) forms an execution basis of the VNF/CNF. The NFVI is a base that enables flexible handling as virtualized hardware resources such as virtualized computing, virtualized storage, and virtualized network in which hardware resources of physical machines (servers) such as computing, storage, and network functions are virtualized in a virtualization layer such as a hypervisor.

In practice, a plurality of NFVIs are provided, and each NFVI is connected to a plurality of VNFs/CNFs to monitor the VNFs/CNFs.

A virtualized infrastructure manager (VIM) serves as a cloud controller. That is, the VIM controls the NFVI via a virtualization layer (performs computing, storage, network resource management, problem monitoring of the NFVI that is an execution basis of the NFV, resource information monitoring, and the like).

In practice, a plurality of VIMs are provided, and each VIM is connected to a large number of NFVIs to monitor the NFVIs.

A VNF Manager (VNFM) manages VNFs/CNFs. Specifically, the VNFM controls the NFVI via the virtualization layer (performs computing, storage, network resource management, problem monitoring of the NFVI, resource information monitoring, and the like).

In practice, a plurality of VNFMs are provided, and each VNFM is connected to a plurality of VNFs/CNFs and a plurality of VIMs to monitor the VNFs/CNFs and the VIMs.

An NFV orchestrator (NFVO) performs orchestration of NFVI resources, management of network resources, and management of network services. The NFVO has a repository of NFV instances and a repository of NFVI resources.

The NFVO is connected to a plurality of VNFMs and a plurality of VIMs to monitor the VNFMs and the VIMs.

The NFVO has a function of transmitting a command for auto-healing to a component related to the auto-healing in order to recover a VNF/CNF having a problem, in a case of receiving a report indicating that the component of a virtualization environment has the problem.

Further, the NFVO has a function of transmitting an auto-scaling command to a component related to auto-scaling in order to automatically add a new VNF/CNF, in a case of receiving a report indicating that the processing load of the component in the virtualization environment exceeds an allowable value.

The NFVO, the VNFM, and the VIM constitute a management and orchestration (MANO). The MANO has a management function of a virtualization environment and an orchestration function.

An operations support system (OSS) is a system (device, software, mechanism, or the like) necessary for a communication company (carrier) to construct and operate a service. A business support system (BSS) is an information system (device, software, mechanism, or the like) used by a communication company (carrier) for charging, billing, customer service, and the like.

The OSS and the BSS function in cooperation with each other, and may be provided integrally and inseparably. In the following description, "OSS/BSS" means a system including both an OSS and a BSS, but the OSS and the BSS may be separately provided.

The OSS/BSS is connected to the NFVO and is connected to a plurality of EMSs.

As described above, the VNF/CNF may serve as an element of an EPC or an element of an IMS for mobile services.

Therefore, there is a network for the application (VNF/CNF) to provide mobile services. The thick solid line in FIG. 1 indicates a mobile service network used for mobile services in the virtualization environment.

The mobile service network connects a mobile network Mo and a plurality of VNFs/CNFs. The VNFs/CNFs communicate with the mobile network Mo via the mobile service network and communicate with each other via the mobile service network.

Figure 2:
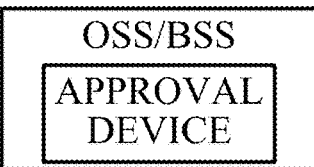
FIG. 2 is a diagram illustrating an installation example of an approval device according to the present disclosure.
Figure 3:
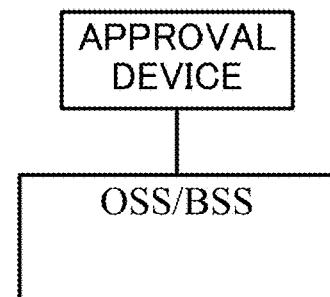
FIG. 3 is a diagram illustrating another installation example of the approval device according to the present disclosure.

The present embodiment provides an approval device that automatically approves a change request when a change of the virtualization environment is requested. FIGS. 2 and 3 illustrate installation examples of the approval device, respectively.

In the example of FIG. 2, the approval device is provided in the OSS/BSS.

In the example of FIG. 3, the approval device is connected to the OSS/BSS.

Figure 4:
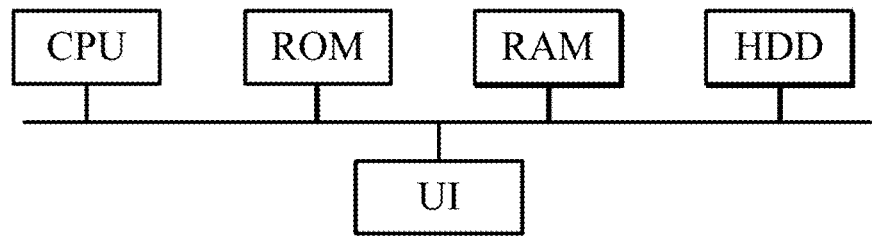
FIG. 4 is a block diagram illustrating an example of a hardware configuration of the approval device.

As illustrated in FIG. 4, the approval device includes a central processing unit (CPU), that is, a processor, a read only memory (ROM), a random access memory (RAM), a hard disk drive (HDD), and a user interface (UI).

The ROM or the HDD stores a computer program required for an operation of the approval device. The ROM or the HDD stores data such as parameters required for the operation of the approval device.

The CPU executes a computer program stored in the ROM or the HDD while using data stored in the ROM or the HDD, and operates in accordance with the computer program.

The RAM is used as a work area of the CPU.

The UI may be a combination of a display device and a pointing device (for example, a mouse or a touch pad), or may be a touch panel having functions of both the display device and the pointing device. A user of the approval device can provide instructions to the CPU by using the UI.

In the installation example of FIG. 3, the approval device includes a communication interface (not illustrated) for communicating with the OSS or the NVFO.

Figure 5:
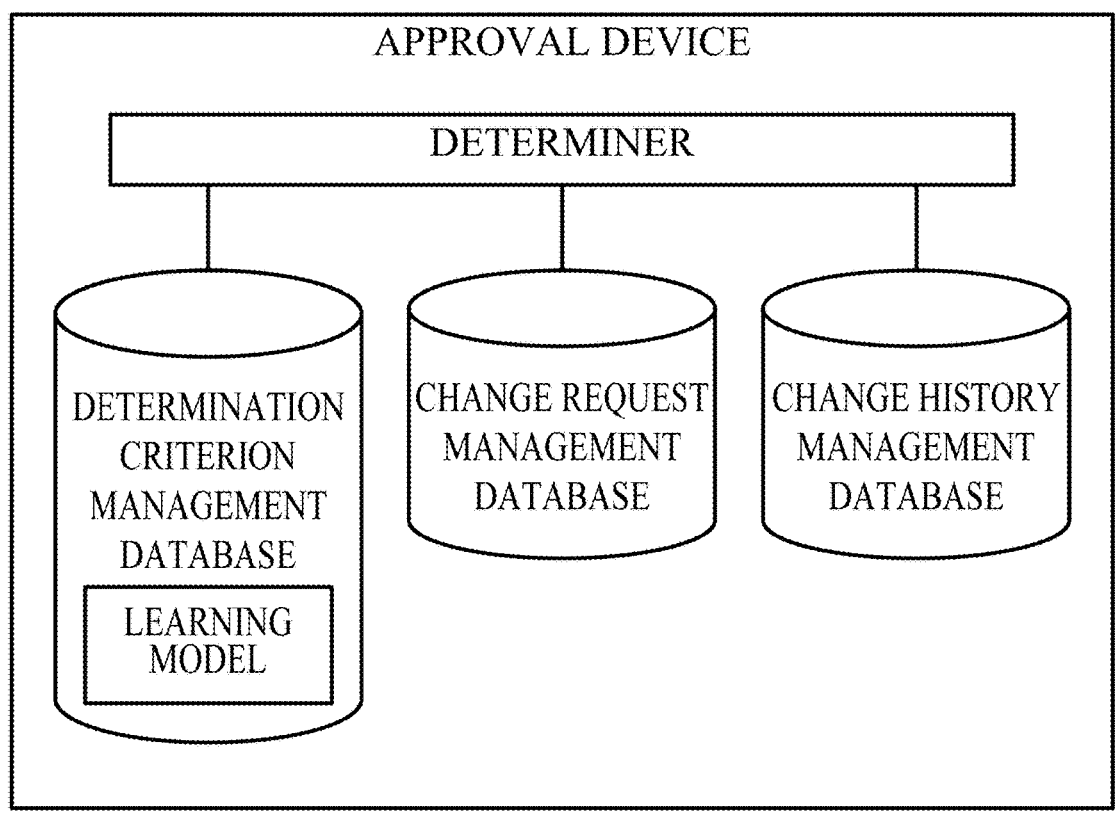
FIG. 5 is a block diagram illustrating an example of a hardware configuration from another viewpoint of the approval device.

FIG. 5 is a block diagram illustrating an example of a hardware configuration from another viewpoint of the approval device. The approval device includes a determiner, a change request management database, a change history management database, and a determination criterion management database.

The determiner corresponds to the CPU of FIG. 4.

The change request management database, the change history management database, and the determination criterion management database are stored in the HDD of FIG. 4. The databases may be stored in a single HDD or may be stored in a plurality of HDDs.

In the change request management database, change requests for the network virtualization environment are registered. When a change requester transmits a change request to the OSS, the OSS registers the change request in the change request management database.

In the change history management database, records of changes executed according to past change requests are stored. When a change is executed, regardless of success or failure of the change, the OSS registers a record of the change including the execution result in the change history management database.

In the determination criterion management database, multiple determination criteria used to determine whether to automatically approve or reject change requests are stored. A change approver registers determination criteria in the determination criterion management database. The change approver is a person who approves change requests when automatic approval is not used. Each determination criterion has a comparison item that may be common in a change request and a record of change (change record).

The determiner acquires a change request from the change request management database. In a case in which a determination criterion that coincides with a comparison item included in the change request is stored in the determination criterion management database, the determiner searches for a record of past change that coincides with the determination criterion (execution result of a change of the same type executed in the past) in the change history management database. If one or more execution results of past changes are detected, the determiner determines whether or not a predetermined condition related to execution results of the past changes is satisfied. The determiner automatically approves the change request if the predetermined condition is satisfied, and the determiner automatically rejects the change request if the predetermined condition is not satisfied. Since the determiner thus determines whether or not to approve a change request based on execution results of past changes of the same type, it is possible to quickly and accurately approve the change in the network virtualization environment.

In the determination criterion management database, a learning model for assisting approval of the change request by the determiner may be stored.

Examples of items included in a change request that should be registered in the change request management database will be described with reference to FIG. 6.

The ID is used to uniquely identify and manage a change. Whenever a change request is newly created, the ID is given to the change request by the system.

The change group name is used to identify and manage changes of the same type. The same type of change is, for example, update of firmware for a patch for the same hardware. For example, there is a case in which changes of the same type are performed at different places and at different time points. In this case, multiple change requests having different IDs are registered in the change request management database, but it is possible to recognize that the changes are the same type if the change requests have the same change group name.

The priority/urgency indicates the priority and urgency of the change. The priority and the urgency are determined in accordance with the rules of the system management company. For example, "P1" indicates the highest priority and urgency, and "P4" indicates the lowest priority and urgency.

The influence degree indicates the influence degree on the existing service due to the change. For example, "Major" indicates that the influence degree is large, "Minor" indicates that the influence degree is small, and "No impact" indicates that there is no influence.

The target domain indicates the target domain in which the change is performed. For example, "Infra" indicates the infrastructure, "RAN" indicates the radio access network, and "Core" indicates the core network.

The type of hardware indicates a model number of hardware to be replaced, or a model number of hardware to which software or firmware update is applied. Examples of the hardware include a server, a CPU, a memory, an HDD, a solid state drive (SSD), and a network interface card (NIC). One change request may designate a plurality of pieces of hardware.

The version of the firmware indicates the version of the firmware to be updated in the hardware. Examples of firmware include a baseboard management controller (BMC), a basic input output system (BIOS), and a redundant arrays of inexpensive disks (RAID) controller. One change request may designate a plurality of pieces of firmware.

The version of the software indicates the version of the software to be updated in the hardware. Examples of the software include the operating system (OS), a platform, an application, and a device driver. One change request may designate a plurality of pieces of software.

The change procedure description, the scheduled start time, the scheduled end time, and the assumed problem list will be reviewed not only by the change approver but also by a change executor. The change executor is a person who executes change of the virtualization environment.

The change procedure description is a character string for describing the procedure for performing the change, and may include a guide image for making the procedure easy to be understood as necessary. In a case in which an execution program is used to execute the change, the value of the change procedure description includes the version of the execution program used to execute the change. The change executor executes the change with reference to the value of the change procedure description.

The scheduled start time indicates the scheduled date and time when the change should be started. The change executor starts the change at the scheduled start time.

The scheduled end time indicates the scheduled date and time when the change should be ended. The change executor ends the change at or before the scheduled end time.

The assumed problem list describes all problems that may occur during the change. The change executor executes the change while avoiding the problems with reference to the assumed problem list.

Examples of items included in a change record (record of change) that should be registered in the change history management database will be described with reference to FIG. 7. When a change is executed, regardless of success or failure of the change, the OSS registers the record of the change including the execution result in the change history management database. At this time, the OSS adds the result of actual execution to the change request to generate the change record. Thus, many of the items included in the change record are common to the items included in the change request of FIG. 6.

Specifically, the ID, the change group name, the priority/urgency, the influence degree, the target domain, the type of hardware, the version of firmware, the version of software, the change procedure description, the scheduled start time, the scheduled end time, and the assumed problem list are taken over from the change request.

On the other hand, the actual problem list, the start time, the end time, the execution result description, and the success/failure flag are not included in the change request but included in the change record. The OSS is notified of these items from the component having the change target, or notified by the change executor.

The actual problem list describes all problems that actually occurred when the change was performed.

The start time indicates the date and time when the change is actually started.

The end time indicates the date and time when the change is actually ended.

The execution result description describes, for example, a log that confirms the execution result.

The success/failure flag indicates whether the change has been successful or failed. That is, "0" indicates success, and "1" indicates failure.

FIGS. 8 to 11 illustrate examples of determination criteria for automatic approval of a change request, respectively. The determination criteria are stored in the determination criterion management database. Each example of the determination criterion has the change group name, the priority/urgency, the influence degree, the target domain, the type of hardware, the version of firmware, the version of software, and the success count threshold value.

In the determination criterion, the change group name, the priority/urgency, the influence degree, the target domain, the type of hardware, the version of firmware, and the version of software are comparison items. Each comparison item is an item for determining whether or not there is a determination criterion to be applied to a change request. Comparison items are included in the change request (see FIG. 6). In a case in which values of all the comparison items included in a change request coincide with the comparison items of a determination criterion stored in the determination criterion management database, the determination criterion is applied to the change request.

Comparison items are also included in the change record (see FIG. 7). If there is a determination criterion to be applied to a change request, a change record having comparison items that coincide with all comparison items of the determination criterion is searched in the change history management database. A change record having the comparison items that coincide with all the comparison items of the determination criterion is an execution result of a past change executed according to a past change request of the same type as the current change request. Thus, the comparison item is an item for searching for execution results of past changes executed according to past change requests of the same type as the current change request.

In the determination criterion, the change group name is used to identify and manage the same type of change as in the change request. In the determination criterion, the value of the change group name may have multiple change group names.

In the determination criterion, the value of the priority/urgency may have a range of priority/urgency as illustrated in FIGS. 8 and 9, or may have a specific value of priority/urgency as illustrated in FIG. 10. For example, when the value of the priority/urgency of a change request is P1 or P2, the determination criterion of FIG. 8 may coincide with the change request, but the determination criterion of FIGS. 9 and 10 does not coincide with the change request. In addition, for example, in a case in which the determination criterion of FIG. 9 coincides with a change request, a change record in which the value of the priority/urgency is P3 or P4 is searched in the change history management database.

In the determination criterion, the value of the influence degree may have a range of influence degree as illustrated in FIGS. 8 and 9, or may have a specific value of influence degree as illustrated in FIG. 10.

In the determination criterion, the value of the target domain indicates the target domain in a manner similar to that in the change request.

In the determination criterion, the value of the type of hardware indicates the model number of hardware to be replaced, or the model number of hardware to which software or firmware update is applied in a manner similar to that in the change request.

In the determination criterion, the version of the firmware may have a range of versions as illustrated in FIGS. 8 and 9, or may have a specific value of version as illustrated in FIG. 10.

In the determination criterion, the version of the software may have a range of versions, as illustrated in FIG. 8, or may have a specific value of version, as illustrated in FIG. 9.

In the determination criterion, it is not necessary that values are designated for all the comparison items. For example, in FIG. 10, the value of the version of the software is empty. Such a comparison item in which no value is designated functions as a wildcard, so that regardless of the value of the corresponding comparison item in a change request, the value of the comparison item in the change request is regarded to coincide with the value of the comparison item in the determination criterion. In addition, for such a comparison in which no value is designated in the determination criterion, regardless of the value of the corresponding comparison item in a change record, the value of the comparison item in the change record is regarded to coincide with the value of the comparison item in the determination criterion.

As illustrated in FIG. 11, only one comparison item may have a value. In this case, as long as the value of the change group name in a change request is Patch application 3, regardless of other items in the change request, the change request is regarded to coincide with the determination criterion illustrated in FIG. 11. In addition, in this case, as long as the value of the change group name in a change record is Patch application 3, regardless of other items in the change record, the change record is regarded to coincide with the determination criterion illustrated in FIG. 11.

Each determination criterion includes the success count threshold value in addition to comparison items. The success count threshold value is a criterion for whether or not to automatically approve a change request. Specifically, if the number of successful changes executed in the past according to past change requests of the same type as the current change request is less than the success count threshold value, the current change request is automatically rejected. If the number of successful changes of the same type executed in the past is equal to or greater than the success count threshold value and changes of the same type have not failed in the past, the current change request is automatically approved.

Figure 12:
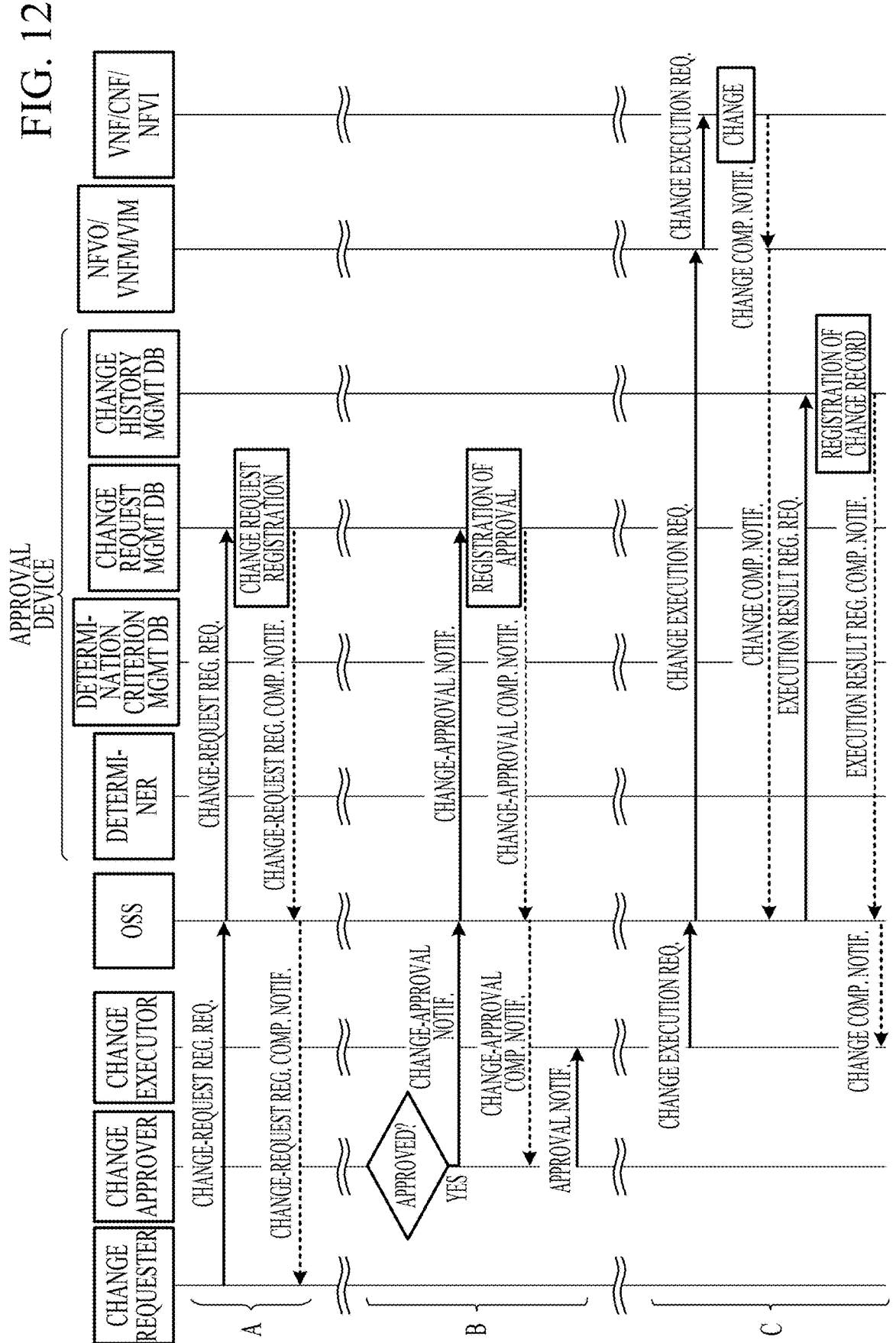
FIG. 12 is a sequence diagram illustrating a basic example of a change request registration process, a basic example of a change approval registration process, and a basic example of a change execution process in the network virtualization environment according to the present disclosure.

FIG. 12 illustrates a basic example of a change request registration process A, a basic example of a change request approval registration process B, and a basic example of a change execution process C in the network virtualization environment according to the present disclosure. In the example of FIG. 12, in the change request approval registration process B, approval by the human change approver is performed instead of automatic approval.

In FIGS. 12 to 15, "DB" represents database, and "MGMT" represents management.

In the change request registration process A, the human change requester transmits a change-request registration request from the change requester's communication device (for example, a computer) to the OSS. The change-request registration request includes the change request illustrated in FIG. 6. The OSS transfers the change-request registration request to the approval device, and the approval device registers the change request in the change request management database.

Thereafter, the approval device transmits a change-request registration completion notification as a response to the OSS, and the OSS transfers the change-request registration completion notification to the communication device of the change requester.

In this manner, multiple change requests are accumulated in the change request management database.

In the change request approval registration process B, the human change approver checks each change request accumulated in the change request management database. If the change request is incomplete, the change approver rejects the change request, and transmits the rejection of the change request and the reasons thereof from the change approver's communication device (for example, a computer) to the communication device of the change requester.

If the change approver approves the change request, the change approver transmits a change-approval notification from the change approver's communication device to the OSS. The OSS transfers the change-approval notification to the approval device, and the approval device registers, in the change request management database, that the change request has been approved. Registration of approval of the change request may be, for example, deletion of the change request from the change request management database.

Thereafter, the approval device transmits a change-approval completion notification as a response to the OSS, and the OSS transfers the change-approval completion notification to the communication device of the change approver.

Upon receiving the change-approval completion notification, the change approver transmits an approval notification from the change approver's communication device to the change executor. The approval notification includes the corresponding change request that was approved.

After receiving the approval notification, in the change execution process C, the human change executor transmits a change execution request from the change executor's communication device (for example, a computer) to the OSS. The change execution request includes the change request that was approved and that is now being executed. The OSS transfers a change execution request to the NFVO, the VNFM, or the VIM that manages the VNF, the CNF, or the NFVI that has the change target, and the NFVO, the VNFM, or the VIM transfers the change execution request to the VNF, the CNF, or the NFVI. Upon receiving the change execution request, the VNF, the CNF, or the NFVI executes the change.

Thereafter, the VNF, CNF, or NFVI transmits a change completion notification as a response to the NFVO, VNFM, or VIM, and the NFVO, VNFM, or VIM transfers the change completion notification to the OSS.

Upon receiving the change completion notification, the OSS transmits an execution result registration request to the approval device. The execution result registration request includes the change record illustrated in FIG. 7. The approval device registers the change record in the change history management database.

Thereafter, the approval device transmits an execution result registration completion notification as a response to the OSS. The OSS that has received the execution result registration completion notification transmits a change completion notification to the communication device of the change executor.

By repeating the change request approval registration process B and the change execution process C, multiple change records are accumulated in the change history management database.

In the change execution process C of FIG. 12, it is assumed that the VNF, the CNF, or the NFVI has a change target. However, in a case in which the NFVO, the VNFM, or the VIM has a change target, change is performed on the NFVO, the VNFM, or the VIM, and after completion of the change, the NFVO, the VNFM, or the VIM transmits the change completion notification as a response to the OSS.

In the change execution process C of FIG. 12, it is assumed that the change is automatically executed in the component having the change target. In this case, the component includes the actual problem list, the start time, the end time, and the execution result description in the change completion notification transmitted by the component. However, in a case in which a human change executor replaces hardware in a component in the virtualization environment, the change executor visits the place of the component and performs the change operation (replacement). In this case, the change executor transmits a change completion notification including the actual problem list, the start time, the end time, and the execution result description to the OSS from the change executor's communication device instead of the component, and the OSS transmits an execution result registration request including the change record including these items to the approval device.

Figure 13:
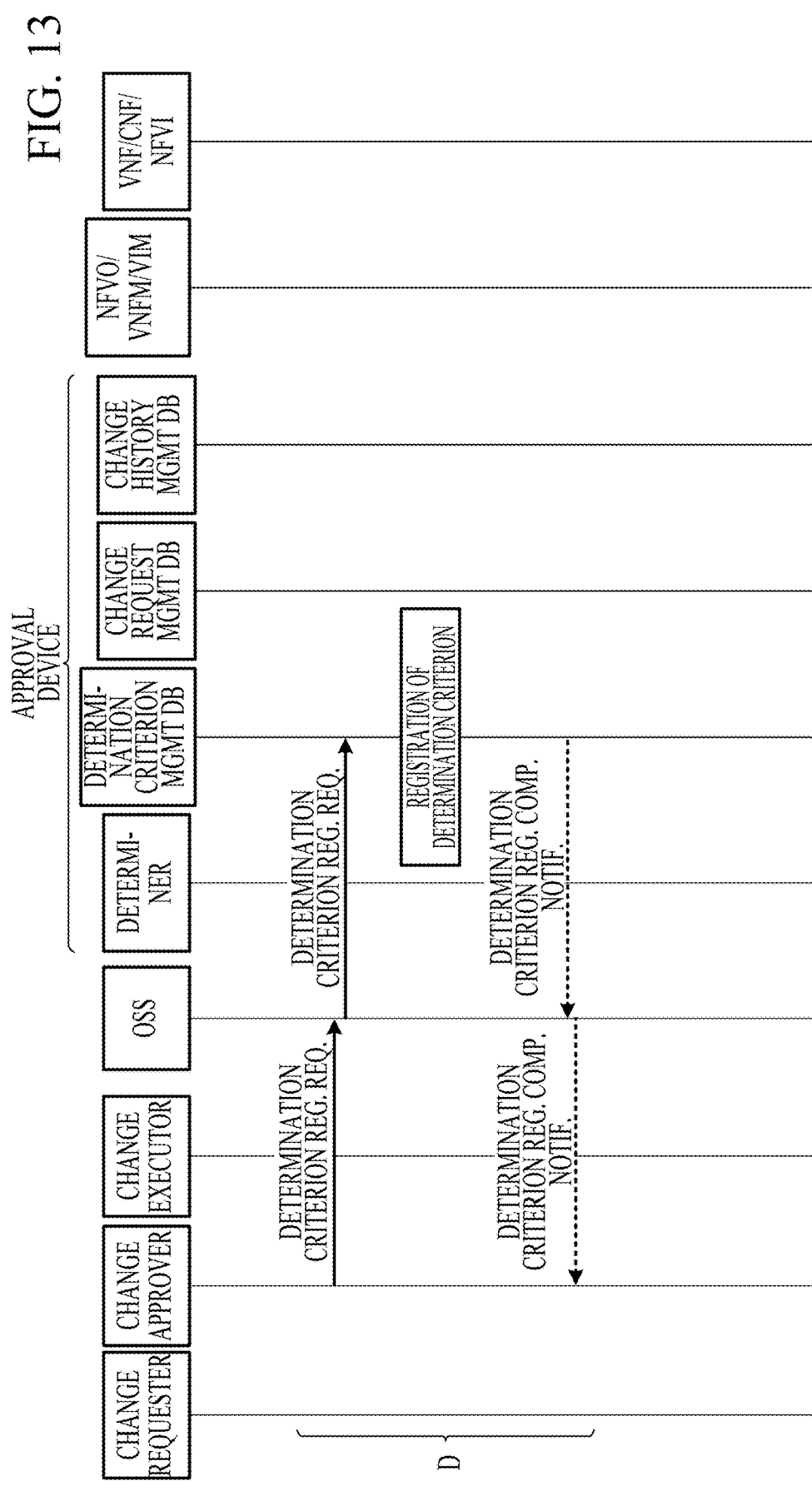
FIG. 13 is a sequence diagram illustrating an example of a determination criterion registration process in the network virtualization environment according to the present disclosure.

FIG. 13 illustrates an example of a determination criterion registration process D in the network virtualization environment according to the present disclosure. In the process D, when the human change approver generates a determination criterion exemplified in FIGS. 8 to 11, the change approver transmits a determination criterion registration request to the OSS by using the change approver's communication device. The determination criterion registration request includes the determination criterion. The OSS transfers the determination criterion registration request to the approval device, and the approval device registers the determination criterion in the determination criterion management database.

Thereafter, the approval device transmits the determination criterion registration completion notification as a response to the OSS. The OSS that has received the determination criterion registration completion notification transfers the determination criterion registration completion notification to the communication device of the change approver.

In this manner, multiple determination criteria are accumulated in the determination criterion management database.

Figure 14:
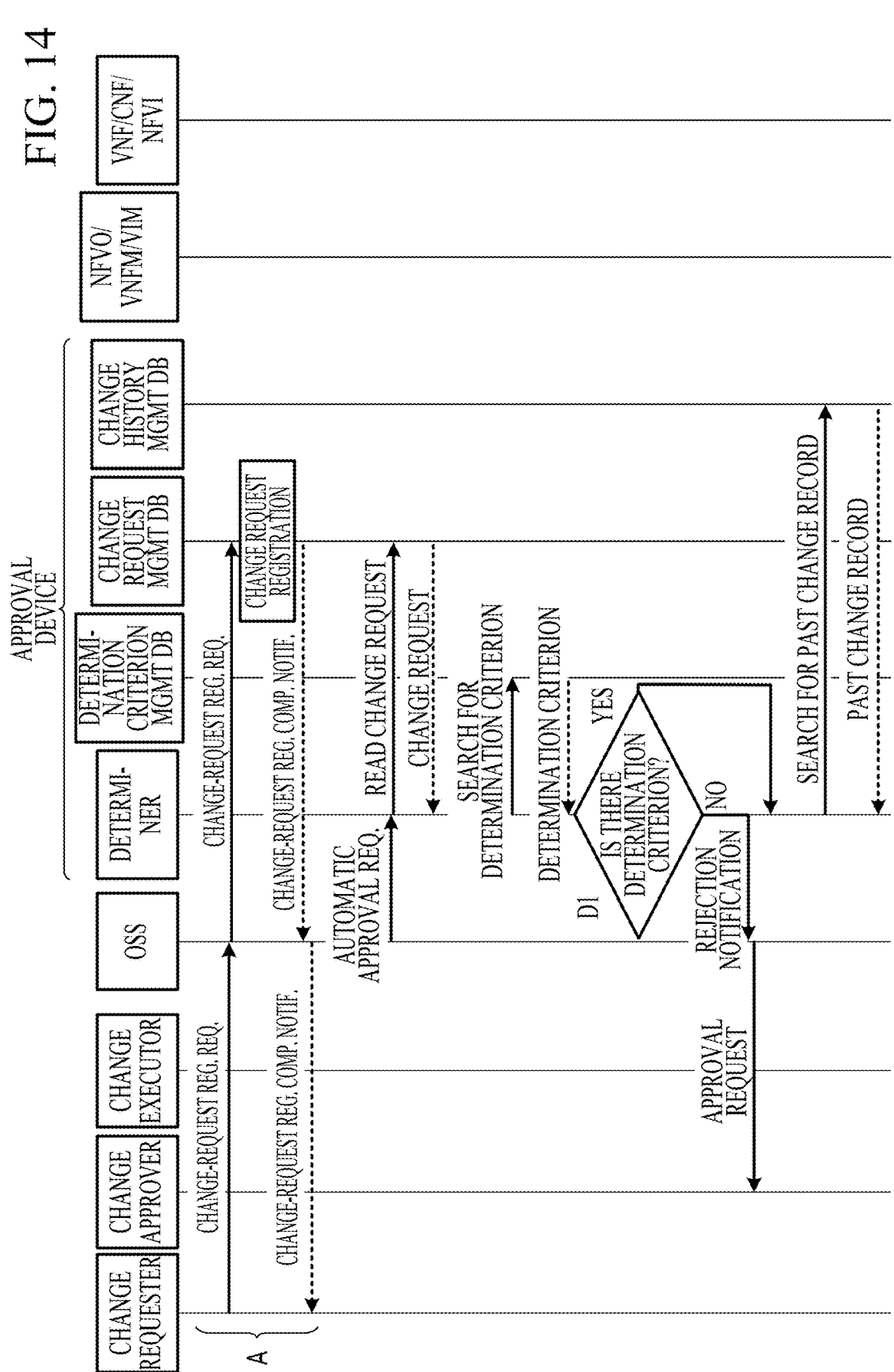
FIGS. 14 and 15 form a sequence diagram illustrating an example of the change request registration process and a change request automatic approval process in the network virtualization environment according to the present disclosure.
Figure 15:
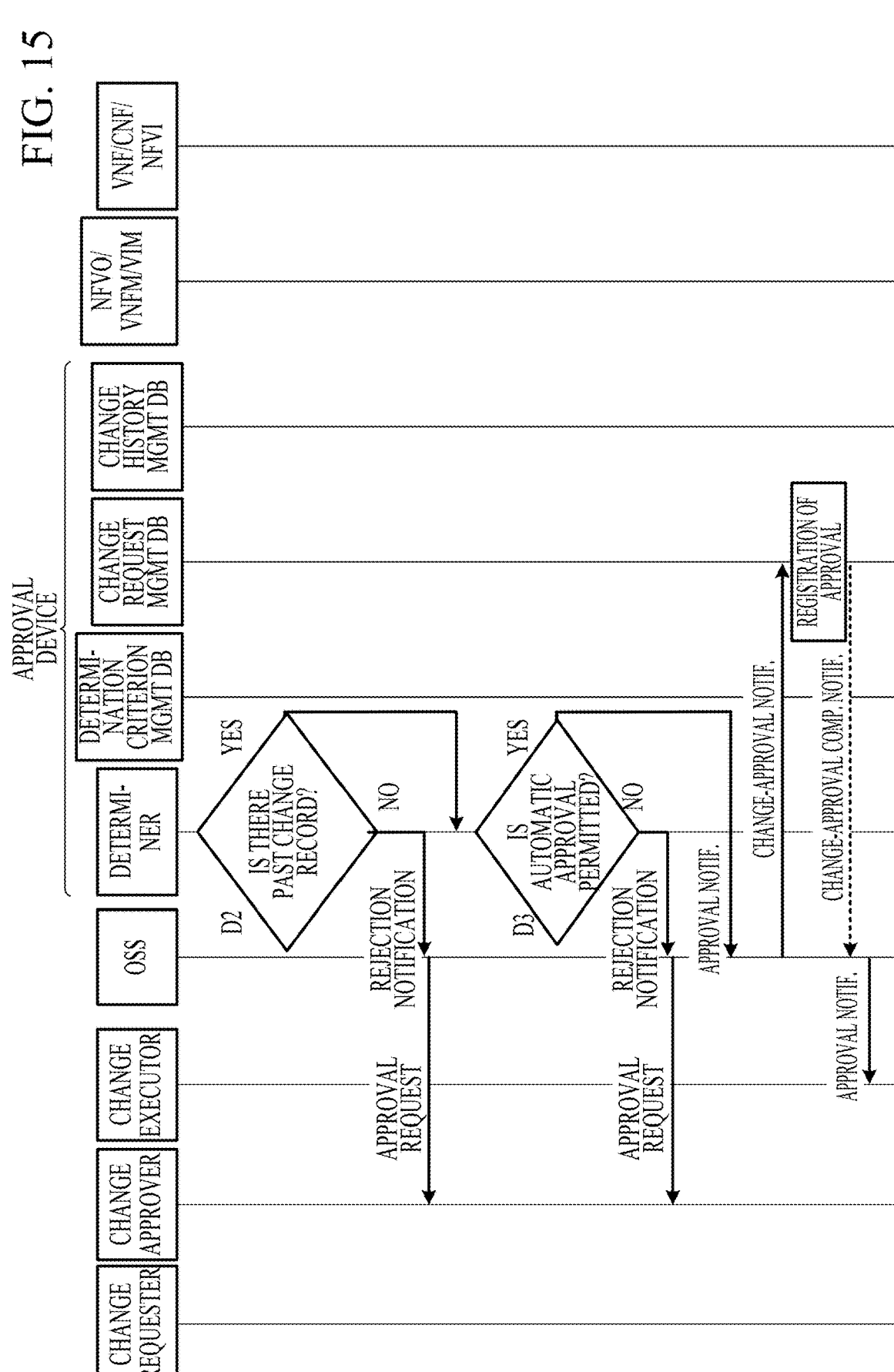

Next, a change request automatic approval process in the network virtualization environment according to the present disclosure will be described with reference to FIGS. 14 and 15.

In order to execute the change request automatic approval process, the change execution process C of FIG. 12 needs to be executed a sufficient number of times, and the determination criterion registration process D of FIG. 13 also needs to be executed a sufficient number of times.

When a change request registration process A has completed and the OSS transfers the change-request registration completion notification to the communication device of the change requester, the change request automatic approval process starts.

In the change request automatic approval process, first, the OSS transmits an automatic approval request to the approval device.

Then, the determiner (that is, the CPU) of the approval device reads (acquires) the change request (current change request) registered in the change request registration process A from the change request management database.

The determiner of the approval device extracts the values of all the comparison items included in the current change request. Then, the determiner searches for a determination criterion having a value of the comparison item that coincides with the value of the comparison item extracted from the current change request, in the determination criterion management database.

Then, in Step D1, the determiner determines whether or not a determination criterion having a value of the comparison item that coincides with the value of the comparison item extracted from the current change request has been detected. If such a determination criterion is not detected, the determiner automatically rejects the current change request and transmits a rejection notification to the OSS. The OSS (the communication device communicating with the network management apparatus) that has received the rejection notification transmits an approval request to the communication device of the change approver. Thus, if the change request is automatically rejected, the change approver can know that the change approver must approve or reject the change request. In response to the approval request, the change approver can check the current change request. That is, the change request approval registration process B of FIG. 12 is executed.

If the determination criterion is detected, the determiner searches for past change records having a value of the comparison item that coincides with a value of the comparison item of the determination criterion (execution results of past changes executed according to past change requests of the same type as the current change request), in the change history management database.

Then, in Step D2 (FIG. 15), the determiner determines whether or not the past change record has been detected. If the past change record is not detected, the determiner automatically rejects the current change request and transmits a rejection notification to the OSS. The OSS that has received the rejection notification transmits an approval request to the communication device of the change approver.

If the past change record has been detected, the determiner determines whether to permit automatic approval in Step D3. Specifically, the determiner determines whether or not a predetermined condition related to execution results of past changes is satisfied.

If the predetermined condition is not satisfied, the determination in Step D3 is negative, and the determiner automatically rejects the current change request and transmits the rejection notification to the OSS. The OSS that has received the rejection notification transmits the approval request to the communication device of the change approver. Thus, the change approver can know that the change approver must approve or reject the change request.

If the predetermined condition is satisfied, the determination in Step D3 is affirmative, and the determiner automatically approves the current change request and transmits an approval notification to the OSS. The OSS that has received the approval notification transmits a change-approval notification to the approval device, and the approval device registers, in the change request management database, that the change request has been approved. Registration of approval of the change request may be, for example, deletion of the change request from the change request management database.

Thereafter, the approval device transmits the change-approval completion notification as a response to the OSS. Then, the OSS (the communication device communicating with the network management apparatus) transmits an approval notification to the communication device of the change executor. Thus, in a case in which the change request is automatically approved, the change executor can know that the change request has been approved. The approval notification includes the change request that has been approved and that should be executed by the change executor. After the approval notification, the change execution process C in FIG. 12 is executed.

As described above, since the current change request is approved or rejected based on execution results of past changes of the same type, it is possible to quickly and accurately approve or reject the change in the network virtualization environment.

Figure 16:
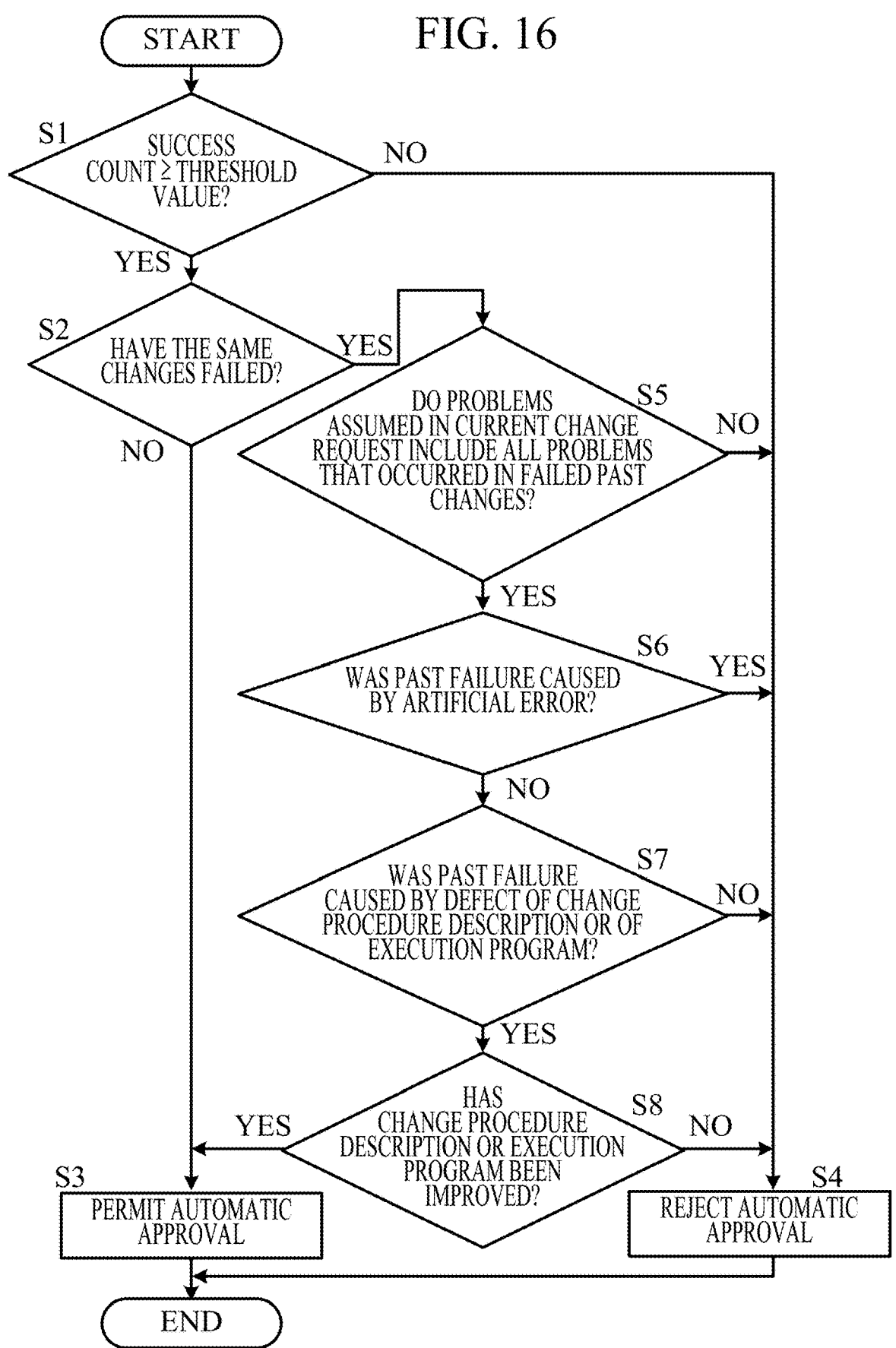
FIG. 16 is a flowchart illustrating details of determination of permission for automatic approval of a change request in FIG. 15.

Next, details of determination of permission for automatic approval of the change request (Step D3) in FIG. 15 will be described with reference to the flowchart in FIG. 16.

First, in Step S1, the determiner refers to the value of the success/failure flag in each past change record detected from the change history management database (execution results of past changes executed according to past change requests of the same type as the current change request), and determines whether or not the success count of past changes of the same type is equal to or greater than the success count threshold value designated in the determination criterion. When the number of past change records of which the value of the success/failure flag is "0" (success) is equal to or more than the success count threshold value in the determination criterion, the determination in Step S1 is affirmative. Otherwise the determination is negative.

If the determination in Step S1 is affirmative, the operation proceeds to Step S2. In Step S2, the determiner refers to the values of the success/failure flags in the past change records, and determines whether or not past changes of the same type have failed. If at least one past change record in which the value of the success/failure flag is "1" (failure) is detected, the determination in Step S2 is affirmative, otherwise the determination is negative.

If the determination in Step S2 is negative, the operation proceeds to Step S3. In Step S3, the determiner permits automatic approval, and the operation ends.

On the other hand, if the determination in Step S1 is negative, the operation proceeds to Step S4. In Step S4, the determiner rejects the automatic approval, and the operation ends. That is, the current change request is automatically rejected.

Therefore, with reference to execution results of past changes executed according to past change requests of the same type as the current change request, the determiner automatically rejects the current change request if the success count of executed past changes is less than the threshold value, and automatically approves the current change request if the success count of executed past changes is equal to or greater than the threshold value and if past changes of the same type have not failed. If the success count of past changes executed according to past change requests of the same type as the current change request is equal to or greater than the threshold value, and if the past executed changes of the same type have not failed, there is a high probability that the change executed according to the current change request will succeed. In this case, it is possible to automatically approve the current change request quickly.

If the determination in Step S2 is affirmative (that is, if the success count of executed past changes is equal to or greater than the threshold value and if one or more past executed changes of the same type have failed), the operation proceeds to Step S5. In Step S5, the determiner compares the value of the assumed problem list in the current change request with the values of the actual problem lists of all the failed past change records, and determines whether or not the problems assumed in the current change request include all the problems that occurred in failed past changes.

If the determination in Step S5 is negative (if the problems assumed in the current change request do not include all the problems that occurred in failed past changes), the operation proceeds to Step S4, and the determiner rejects the automatic approval. That is, the current change request is automatically rejected.

If the assumed problems in the current change request are insufficient in comparison with the problems that occurred in failed past changes, there is a high probability that the current change request is incomplete. For example, an unexpected problem that actually occurred in a past change may not be considered in the current change request. In such a case, when the change is executed according to the current change request, there is a high probability that the change will fail. Thus, the change requester needs to correct the change request. In a case in which the above insufficiency is not caused by incompleteness of the change request, it is necessary to further identify the cause, and thus it is necessary to confirm the change request by the change approver, the change requester, and/or other persons. By automatically rejecting the current change request, it is possible to encourage persons involved in the change to take measures.

If the determination in Step S5 is affirmative, the operation proceeds to Step S6. In Step S6, the determiner refers to the change procedure descriptions and the execution result descriptions of the failed past change records, and determines whether or not the past failure was caused by an artificial error on the basis of the value of the change procedure description and the value of the execution result description related to the failed past change. In this determination, the difference between the time length assumed to be required for the change (the difference between the scheduled start time and the scheduled end time) and the time length actually required for the change (the difference between the start time and the end time) may be considered.

In the determination in Step S6, the determiner preferably uses a determination policy generated by a learning model (see FIG. 5) stored in the determination criterion management database. That is, preferably, the determiner determines whether or not the past failure was caused by an artificial error in accordance with the determination policy. As will be described later, the determination policy reflects multiple determination patterns in which the human change approver has determined whether or not the past failure was caused by an artificial error from change procedure descriptions and the execution result descriptions related to failed past changes.

If the determination in Step S6 is affirmative (if it is determined that the past failure was caused by an artificial error), the operation proceeds to Step S4, and the determiner rejects the automatic approval. That is, the current change request is automatically rejected.

If the past failure was caused by an artificial error of the human change executor, there is a high probability that the same failure will occur even though the change is executed according to the current change request. Thus, the change approver and/or responsible persons must improve the change execution procedure and/or the details. By automatically rejecting the current change request, it is possible to encourage persons involved in the change to take measures.

If the determination in Step S6 is negative, the operation proceeds to Step S7, in which the determiner refers to the change procedure description and the execution result description of the failed past change record, and determines whether or not the past failure was caused by a defect of the change procedure description or a defect of the execution program used to execute the failed past change.

In the determination in Step S7, preferably, the determiner uses a detection policy generated by the learning model stored in the determination criterion management database. That is, preferably, the determiner determines, in accordance with the detection policy, whether or not the past failure was caused by a defect of the change procedure description or a defect of the execution program used to execute the failed past change. As described later, the detection policy reflects multiple detection patterns in which the human change approver has detected any defect of change procedure descriptions or any defect of execution programs.

If the determination in Step S7 is negative (if it is determined that the past failure was not caused by a defect of the change procedure description or a defect of the execution program used to execute the failed past changes), the operation proceeds to Step S4, and the determiner rejects the automatic approval. That is, the current change request is automatically rejected.

If it is determined that the past failure was not caused by a defect of the change procedure description or a defect of the execution program, the cause of the past failure is unknown, and there is a high probability that the same failure occurs even though the current change is executed. Thus, the change requester and/or responsible persons must take some measures. By automatically rejecting the current change request, it is possible to encourage persons involved in the change to take measures.

If the determination in Step S7 is affirmative (if it is determined that the past failure was caused by a defect of the change procedure description or a defect of the execution program used to execute the failed past change), the operation proceeds to Step S8.

In Step S8, the determiner compares the value of the change procedure description (which may include the version of the execution program) related to the failed past change with the value of the change procedure description (which may include the version of the execution program) of the current change request. Then, the determiner determines whether or not the defect of the change procedure description or the execution program has been revised. When the value of the change procedure description (excluding the version of the execution program) of the current change request is different from the value of the change procedure description (excluding the version of the execution program) related to the failed past change, the determiner determines that the defect of the change procedure description has been revised. In a case in which the version of the execution program to be used in the change related to the current change request is newer than the version of the execution program used in the failed past change, the determiner determines that the defect of the execution program has been revised.

If the determination in Step S8 is negative (if the defect has not been revised), the operation proceeds to Step S4, and the determiner rejects the automatic approval. That is, the current change request is automatically rejected.

If it is determined that the past failure is caused by a defect of the change procedure description or a defect of the execution program, and as long as the same change procedure description or the same execution program is used, there is a high probability that the same failure occurs even though the current change is executed. Thus, the change procedure description or the execution program needs to be improved by the change requester and/or responsible persons. By automatically rejecting the current change request, it is possible to encourage persons involved in the change to take measures.

If the determination in Step S8 is affirmative (if the defect has been revised), the operation proceeds to Step S3, in which the determiner permits the automatic approval.

Even if a past change executed according to a past change request of the same type as the current change request has failed, there is a high probability that the change executed according to the current change request will succeed since the defect that has caused the past failure has been revised. In this case, it is possible to automatically approve the current change request quickly.

As described above, in the present embodiment, it is possible to quickly and accurately approve or reject the change in the network virtualization environment.

Step S5 may be omitted. In this case, when the determination in Step S2 is affirmative, the operation may directly proceed to Step S6.

Step S6 may be omitted. In this case, when the determination in Step S5 is affirmative, the operation may directly proceed to Step S7.

Steps S7 and S8 may be omitted. In this case, when the determination in Step S6 is negative, the operation may proceed to Step S3.

Figure 17:
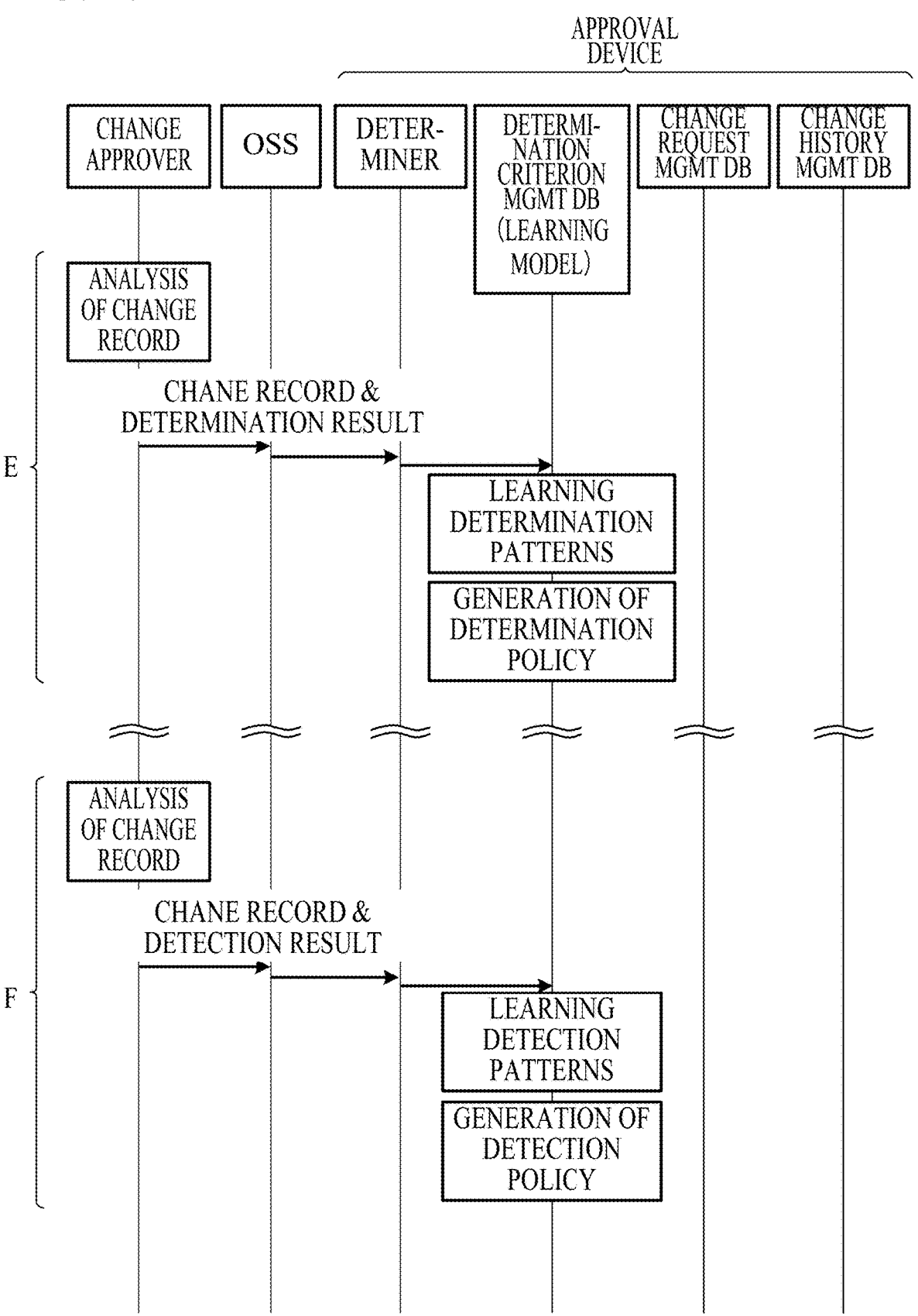
FIG. 17 is a sequence diagram illustrating a learning model learning process according to the present disclosure.

Next, learning of the learning model (see FIG. 5) stored in the determination criterion management database will be described with reference to FIG. 17.

First, a learning process E for generating a determination policy that may be used in the determination in Step S6 in FIG. 16 will be described.

The human change approver analyzes a failed past change record, and determines whether or not the past failure was caused by an artificial error from the change procedure description and the execution result description related to the failed past change. Then, the change approver transmits the failed past change record and the determination result to the OSS by using the change approver's communication device.

In this case, whether or not the determination result indicates that the past failure was caused by an artificial error, the change approver transmits the determination result to the OSS. The change approver may transmit determination reasons to the OSS in addition to the failed past change record and the determination result by using the change approver's communication device.

The OSS transfers the failed past change record and the determination result (and the determination reasons) to the determiner of the approval device, and the determiner records the failed past change record and the determination result in the learning model in the determination criterion management database. Once a certain amount of failed past change records and a certain amount of the determination results are accumulated in the learning model, the determiner causes the learning model to learn determination patterns in which the human change approver determined whether or not the past failures were caused by artificial errors on the basis of the change procedure descriptions and the execution result descriptions related to the failed past changes, and causes the learning model to generate a determination policy based on the determination patterns.

Since the learning model learns the determination patterns of the human change approver and the learning model generates the determination policy based on the determination patterns, the determiner can easily and appropriately determine whether or not a past failure was caused by an artificial error in Step S6.

Next, a learning process F for generating a detection policy that may be used in the determination in Step S7 in FIG. 16 will be described.

The human change approver analyzes a failed past change record and detects any defect of the change procedure description or any defect of the execution program related to the failed past change. Then, the change approver transmits the failed past change record and the detection result to the OSS by using the change approver's communication device. The detection result may indicate a defect portion of the change procedure description or a defect portion of the execution program. The change approver may transmit reasons for incompletion to the OSS in addition to the failed past change record and the detection result by using the change approver's communication device.

The OSS transfers the failed past change record and the detection result (and the reasons for defect) to the determiner of the approval device, and the determiner records the failed past change record and the detection result in the learning model in the determination criterion management database. Once a certain amount of failed past change records and a certain amount of the detection results are accumulated in the learning model, the determiner causes the learning model to learn detection patterns in which the human change approver detected defects of change procedure descriptions or defects of execution programs, and causes the learning model to generate a detection policy based on the detection patterns.

Since the learning model learns the detection pattern of the human change approver and the learning model generates the detection policy based on the detection patterns, the determiner can easily and appropriately determine whether or not a past failure is caused by a defect of the change procedure description or a defect of the execution program.

Although the present disclosure has been illustrated and described above with reference to preferred embodiments of the present disclosure, it will be understood by those skilled in the art that changes in form and details may be made without departing from the scope of the claims. Such changes, modifications, and corrections should fall within the scope of the present disclosure.

As can be understood from the items illustrated in FIGS. 6 to 11, the automatic approval according to the present disclosure is useful in a case in which the change is application of a patch (Patch application) and/or update of firmware or software, but the automatic approval according to the present disclosure is also useful for update of a configuration file of a component of the cloud (change of a setting value in the file), transition of a platform to a maintenance mode, separation from the cloud before physical replacement of a failed server or storage resource, or incorporation of a new server or storage resource after replacement into the cloud. Items related to these changes can be added to the items illustrated in FIGS. 6 to 11 as appropriate.

Aspects of the present disclosure are also set forth in the following numbered clauses:

[1] A network management apparatus including
at least one processor configured to:
acquire a current change request from a change request management database that stores change requests for a virtualization environment of a network;
extract a value of a comparison item included in the current change request;
search for a determination criterion that coincides with the value of the comparison item in a determination criterion management database that stores determination criteria;
automatically reject the current change request if a determination criterion that coincides with the value of the comparison item is not detected in the determination criterion management database;
if a determination criterion that coincides with the value of the comparison item is detected in the determination criterion management database, search for an execution result of a past change executed according to a past change request of the same type as the current change request, the execution result being a record of a past change that coincides with the determination criterion, in a change history management database that stores records of changes executed according to past change requests;
automatically reject the current change request if an execution result of a past change is not detected in the change history management database;
if an execution result of a past change is detected in the change history management database, determine whether or not a predetermined condition related to the execution result of the past change is satisfied;
automatically approve the current change request if the predetermined condition is satisfied; and
automatically reject the current change request if the predetermined condition is not satisfied.
[2] The network management apparatus according to [1], wherein the processor is configured to:
automatically reject the current change request if a success count of executed past changes is less than a threshold value, referring to execution results of past changes; and
automatically approve the current change request if the success count of executed past changes is equal to or greater than the threshold value and if executed past changes have not failed.

[3] The network management apparatus according to [2], wherein the processor is configured to:
determine whether or not problems assumed in the current change request include all problems that occurred in failed past changes if the success count of the executed past changes is equal to or greater than the threshold value and if an executed past change has failed; and
automatically reject the current change request if problems assumed in the current change request do not include all the problems that occurred in the failed past changes.
[4] The network management apparatus according to [2] or [3], wherein the processor is configured to:
determine whether or not a past failure was caused by an artificial error on the basis of a change procedure description and an execution result description related to a failed past change if the success count of the executed past changes is equal to or greater than the threshold value and if an executed past change has failed; and
automatically reject the current change request if it is determined that the past failure was caused by an artificial error.
[5] The network management apparatus according to [2] or [3], wherein the processor is configured to:
determine whether or not a past failure was caused by a defect of a change procedure description or a defect of an execution program used to execute a failed past change if the success count of the executed past change is equal to or greater than the threshold value and if an executed past change has failed;
automatically reject the current change request if it is determined that the past failure was not caused by a defect of the change procedure description or a defect of the execution program;
determine whether or not the defect has been revised if it is determined that the past failure was caused by a defect of the change procedure description or a defect of the execution program;
automatically approve the current change request if the defect has been revised; and
automatically reject the current change request if the defect has not revised.
[6] The network management apparatus according to [4], wherein the processor is configured to:
cause a learning model to learn determination patterns in which a human change approver determined whether or not the past failures were caused by artificial errors on the basis of change procedure descriptions and execution result descriptions related to failed past changes;
cause the learning model to generate a determination policy based on the determination patterns; and
determine whether or not the past failure was caused by an artificial error, in accordance with the determination policy.
[7] The network management apparatus according to [5], wherein the processor is configured to:
cause a learning model to learn detection patterns in which a human change approver detected defects of the change procedure description or defects of the execution program;
cause the learning model to generate a detection policy based on the detection patterns; and
determine whether or not the past failure was caused by a defect of the change procedure description or a defect of the execution program used to execute the failed past change, in accordance with the detection policy.

[8] A network management system including:

the network management apparatus according to any one of [1] to [3]; and a communication device that communicates with the network management apparatus, wherein the communication device transmits an approval notification to a device of a change executor when the processor automatically approves the change request, and transmits an approval request to a device of a change approver when the processor automatically rejects the change request.

[9] A network management method including:

acquiring a current change request from a change request management database that stores change requests for a virtualization environment of a network;

extracting a value of a comparison item included in the current change request;

searching for a determination criterion that coincides with the value of the comparison item in a determination criterion management database that stores determination criteria;

automatically rejecting the current change request if a determination criterion that coincides with the value of the comparison item is not detected in the determination criterion management database;

if a determination criterion that coincides with the value of the comparison item is detected in the determination criterion management database, searching for an execution result of a past change executed according to a past change request of the same type as the current change request, the execution result being a record of a past change that coincides with the determination criterion, in a change history management database that stores records of changes executed according to past change requests;

automatically rejecting the current change request if an execution result of a past change is not detected in the change history management database;

if an execution result of a past change is detected in the change history management database, determining whether or not a predetermined condition related to the execution result of the past change is satisfied;

automatically approving the current change request if the predetermined condition is satisfied; and automatically rejecting the current change request if the predetermined condition is not satisfied.

What is claimed is:

1. A network management apparatus comprising at least one processor configured to:

acquire a current change request from a change request management database that stores change requests for a virtualization environment of a network;

extract a value of a comparison item included in the current change request;

search for a determination criterion that coincides with the value of the comparison item in a determination criterion management database that stores determination criteria;

automatically reject the current change request if a determination criterion that coincides with the value of the comparison item is not detected in the determination criterion management database;

if a determination criterion that coincides with the value of the comparison item is detected in the determination criterion management database, search for an execution result of a past change executed according to a past change request of the same type as the current change request, the execution result being a record of a past change that coincides with the determination criterion, in a change history management database that stores records of changes executed according to past change requests;

automatically reject the current change request if an execution result of a past change is not detected in the change history management database;

if an execution result of a past change is detected in the change history management database, determine whether or not a predetermined condition related to the execution result of the past change is satisfied;

automatically approve the current change request if the predetermined condition is satisfied; and automatically reject the current change request if the predetermined condition is not satisfied.

2. The network management apparatus according to claim 1, wherein the processor is configured to:

automatically reject the current change request if a success count of executed past changes is less than a threshold value, referring to execution results of past changes; and automatically approve the current change request if the success count of executed past changes is equal to or greater than the threshold value and if executed past changes have not failed.

3. The network management apparatus according to claim 2, wherein the processor is configured to:

determine whether or not problems assumed in the current change request include all problems that occurred in failed past changes if the success count of the executed past changes is equal to or greater than the threshold value and if an executed past change has failed; and automatically reject the current change request if problems assumed in the current change request do not include all the problems that occurred in the failed past changes.

4. The network management apparatus according to claim 2, wherein the processor is configured to:

determine whether or not a past failure was caused by an artificial error on the basis of a change procedure description and an execution result description related to a failed past change if the success count of the executed past changes is equal to or greater than the threshold value and if an executed past change has failed; and automatically reject the current change request if it is determined that the past failure was caused by an artificial error.

5. The network management apparatus according to claim 2, wherein the processor is configured to:

determine whether or not a past failure was caused by a defect of a change procedure description or a defect of an execution program used to execute a failed past change if the success count of the executed past change is equal to or greater than the threshold value and if an executed past change has failed;

automatically reject the current change request if it is determined that the past failure was not caused by a defect of the change procedure description or a defect of the execution program;

determine whether or not the defect has been revised if it is determined that the past failure was caused by a defect of the change procedure description or a defect of the execution program;

automatically approve the current change request if the defect has been revised; and automatically reject the current change request if the defect has not revised.

6. The network management apparatus according to claim 4, wherein the processor is configured to:

cause a learning model to learn determination patterns with respect to determinations as to whether or not the past failures were caused by artificial errors on the basis of change procedure descriptions and execution result descriptions related to failed past changes;

cause the learning model to generate a determination policy based on the determination patterns; and determine whether or not the past failure was caused by an artificial error, in accordance with the determination policy.

7. The network management apparatus according to claim 5, wherein the processor is configured to:

cause a learning model to learn detection patterns with respect to detection of defects of the change procedure description or defects of the execution program;

cause the learning model to generate a detection policy based on the detection patterns; and determine whether or not the past failure was caused by a defect of the change procedure description or a defect of the execution program used to execute the failed past change, in accordance with the detection policy.

8. A network management system comprising:

the network management apparatus according to claim 1; and a communication device that communicates with the network management apparatus, wherein the communication device transmits an approval notification to a device of a change executor when the processor automatically approves the change request, and transmits an approval request to a device of a change approver when the processor automatically rejects the change request.

9. A network management method comprising:

acquiring, by at least one processor, a current change request from a change request management database that stores change requests for a virtualization environment of a network;

extracting a value of a comparison item included in the current change request;

searching for a determination criterion that coincides with the value of the comparison item in a determination criterion management database that stores determination criteria;

based on a determination criterion that coincides with the value of the comparison item being detected in the determination criterion management database, searching for an execution result of a past change executed according to a past change request of the same type as the current change request, the execution result being a record of a past change that coincides with the determination criterion, in a change history management database that stores records of changes executed according to past change requests;

based on an execution result of a past change is being detected in the change history management database, determining whether or not a predetermined condition related to the execution result of the past change is satisfied;

automatically approving the current change request if based on the predetermined condition being satisfied.

* * * * *